(12) United States Patent
He

(10) Patent No.: US 11,287,686 B2
(45) Date of Patent: Mar. 29, 2022

(54) LIQUID CRYSTAL DISPLAY DEVICE AND METHOD OF MANUFACTURING THE SAME

(71) Applicant: HKC CORPORATION LIMITED, Guangdong (CN)

(72) Inventor: Huailiang He, Chongqing (CN)

(73) Assignee: HKC CORPORATION LIMITED, Shenzhen (CN)

(*) Notice: Subject to any disclaimer, the term of this patent is extended or adjusted under 35 U.S.C. 154(b) by 81 days.

(21) Appl. No.: 16/761,129

(22) PCT Filed: Nov. 9, 2017

(86) PCT No.: PCT/CN2017/110093
§ 371 (c)(1),
(2) Date: May 1, 2020

(87) PCT Pub. No.: WO2019/084995
PCT Pub. Date: May 9, 2019

(65) Prior Publication Data
US 2020/0271992 A1    Aug. 27, 2020

(30) Foreign Application Priority Data
Nov. 3, 2017    (CN) .......................... 201711070032.9

(51) Int. Cl.
G02F 1/1335    (2006.01)
G02F 1/13363    (2006.01)
(Continued)

(52) U.S. Cl.
CPC ...... *G02F 1/133528* (2013.01); *G02F 1/1337* (2013.01); *G02F 1/13363* (2013.01);
(Continued)

(58) Field of Classification Search
CPC ......... G02F 1/133528; G02F 1/133502; G02F 1/13363; G02F 1/1337; G02F 1/13394;
(Continued)

(56) References Cited

U.S. PATENT DOCUMENTS 6,690,441 B2 * 2/2004 Moriya ................. G02F 1/1393
349/130
2001/0033353 A1 * 10/2001 Shimoshikiryo ..........................
G02F 1/133707
349/129
(Continued)

FOREIGN PATENT DOCUMENTS

CN    1637521 A    7/2005
CN    1954023 A    4/2007
(Continued)

*Primary Examiner* — Edward J Glick
*Assistant Examiner* — David Y Chung
(74) *Attorney, Agent, or Firm* — Muncy, Geissler, Olds & Lowe, P.C.

(57) ABSTRACT

The disclosure provides a liquid crystal display device and a manufacturing method thereof. The liquid crystal display device comprises a liquid crystal unit, a pair of polarizers and an optical compensation film. The liquid crystal unit comprises a first substrate, a second substrate, and a liquid crystal layer disposed between the first substrate and the second substrate. The polarizers clamp the liquid crystal unit. The optical compensation film is disposed between the polarizers and the liquid crystal unit. The optical compensation film comprises a first film layer, a second film layer, a third film layer and a fourth film layer which are stacked together, and respectively have a first refractive index, a second refractive index, a third refractive index and a fourth refractive index with different values. The first refractive index is smaller than the second refractive index. The third refractive index is smaller than the fourth refractive index.

4 Claims, 5 Drawing Sheets

(51) Int. Cl.
  *G02F 1/1337* (2006.01)
  *G02F 1/1339* (2006.01)
  *G02F 1/1343* (2006.01)
(52) U.S. Cl.
  CPC ...... *G02F 1/13394* (2013.01); *G02F 1/13439* (2013.01); *G02F 1/133502* (2013.01); *G02F 1/134309* (2013.01); *G02F 1/133562* (2021.01); *G02F 1/133742* (2021.01)
(58) Field of Classification Search
  CPC ........... G02F 1/134309; G02F 1/13439; G02F 1/133742; G02F 1/133562
  See application file for complete search history.

(56) References Cited

U.S. PATENT DOCUMENTS

2005/0146668 A1    7/2005  Nagai et al.
2008/0100590 A1*   5/2008  Hur .......................... G06F 3/047
                                                        345/173
2008/0252820 A1   10/2008  Ban
2008/0309858 A1   12/2008  Ojima et al.
2010/0026936 A1*   2/2010  Uesaka ............... G02F 1/13363
                                                         349/75

FOREIGN PATENT DOCUMENTS

| CN | 1991508    A | 7/2007  |
| CN | 201622414   U | 11/2010 |
| CN | 103235447  A | 8/2013  |
| CN | 104755967  A | 7/2015  |
| CN | 104849919  A | 8/2015  |
| CN | 106814507  A | 6/2017  |
| CN | 107065291  A | 8/2017  |
| CN | 107807466  A | 3/2018  |

* cited by examiner

LIQUID CRYSTAL DISPLAY DEVICE AND METHOD OF MANUFACTURING THE SAME

BACKGROUND OF THE INVENTION

Field of Invention

This disclosure relates to a liquid crystal display device, and more particularly to a liquid crystal display device having a wide viewing angle, which is applicable to a plane display in a computer, a text processor, an entertainment device or a television, or applicable to the liquid crystal display device using the shutter effect. This disclosure also relates to a method of manufacturing the liquid crystal display device.

Related Art

In the multi-domain vertical alignment (MVA)/axially symmetric aligned microcell (ASM) type liquid crystal display panel of N-type liquid crystal, the light outputted by the backlight module needs to pass through many optical film layers (polarizer, phase difference plate/optical compensation board, protection glass and the like) and liquid crystal cells, and a considerable amount of light will be lost in the process. The previous solution was to have the backlight module output the brighter light to compensate for the above-mentioned amount of loss between the optical film layers. In addition, when the light ray is incident onto the liquid crystal unit in the direction of about 45 degrees deviating from the absorption axis of the polarizer, the associated light leakage increases as the vibration direction of the polarized light ray deviates from one of the absorption axes of the mutually perpendicular polarizers. Meanwhile, because blocking values of the polarizer and the liquid crystal unit will affect the viewing angle characteristic, for example, in a direction about 45 degrees relative to the absorption axis of the polarizer, the contrast of the display device, especially when displayed in grayscale, considerably deteriorates in the viewing angle range of about 35 to 50 degrees.

Thus, if we can develop a liquid crystal display device capable of solving the change of the viewable angle when the included angle between the sight and the absorption axis of the polarizer is changed from the absorption axis of the polarizer, and capable of having the effects of reducing the light leakage and enhancing the brightness, it will bring considerable breakthroughs in this field of technology.

SUMMARY OF THE INVENTION

In view of the deficiencies of the prior art, the inventor has obtained this disclosure after the reach and development have been made. An objective of this disclosure provides a liquid crystal display device, which can solve the change of the viewable angle when the included angle between the sight and the absorption axis of the polarizer is changed from the absorption axis of the polarizer, and can have the effects of reducing the light leakage and enhancing the brightness.

The present disclosure provides a liquid crystal display device. The liquid crystal display device comprises a liquid crystal unit, a pair of polarizers and an optical compensation film. The liquid crystal unit comprises a first substrate, a second substrate opposing the first substrate, and a liquid crystal layer disposed between the first substrate and the second substrate. The pair of polarizers clamp the liquid crystal unit. The optical compensation film is disposed between at least one of the polarizers and the liquid crystal unit. The optical compensation film comprises a first film layer, a second film layer, a third film layer and a fourth film layer. The first film layer, the second film layer, the third film layer and the fourth film layer are stacked together, and respectively have a first refractive index, a second refractive index, a third refractive index and a fourth refractive index with different values, wherein the first refractive index is smaller than the second refractive index, and the third refractive index is smaller than the fourth refractive index.

In one embodiment, the liquid crystal unit further comprises a first electrode layer disposed between the first substrate and the liquid crystal layer.

In one embodiment, the liquid crystal unit further comprises a second electrode layer disposed between the second substrate and the liquid crystal layer.

In one embodiment, the liquid crystal unit further comprises a first vertical alignment layer disposed between the first electrode layer and the liquid crystal layer, and a second vertical alignment layer disposed between the second electrode layer and the liquid crystal layer.

In one embodiment, protrusions and spacers are disposed on the second electrode layer.

In one embodiment, the liquid crystal unit has multiple pixel areas each comprising two or more than two liquid crystal areas which respectively have different liquid crystal molecule orientations.

In one embodiment, an anti-flash layer is disposed on a surface of one of the polarizers closer to a viewer viewing the liquid crystal display device.

In one embodiment, an anti-reflective film is disposed on a surface of the anti-flash layer.

In one embodiment, the liquid crystal layer comprises a nematic liquid crystal material, which has a negative dielectric anisotropy, wherein liquid crystal molecules of the nematic liquid crystal material are substantially perpendicular to the first substrate or the second substrate without any applied voltage.

The present disclosure also provides a liquid crystal display device. The liquid crystal display device comprises a liquid crystal unit, a pair of polarizers and an optical compensation film. The liquid crystal unit comprises a first substrate, a second substrate opposing the first substrate, a liquid crystal layer disposed between the first substrate and the second substrate, a first electrode layer disposed between the first substrate and the liquid crystal layer and a second electrode layer disposed between the second substrate and the liquid crystal layer. The pair of polarizers clamp the liquid crystal unit. The optical compensation film is disposed between at least one of the polarizers and the liquid crystal unit. The optical compensation film comprises a first film layer, a second film layer, a third film layer and a fourth film layer. The first film layer, the second film layer, the third film layer and the fourth film layer are stacked together, and respectively have a first refractive index, a second refractive index, a third refractive index and a fourth refractive index with different values, wherein the first refractive index is smaller than the second refractive index, and the third refractive index is smaller than the fourth refractive index.

In one embodiment, the liquid crystal unit further comprises a first vertical alignment layer disposed between the first electrode layer and the liquid crystal layer, and a second vertical alignment layer disposed between the second electrode layer and the liquid crystal layer.

In one embodiment, protrusions and spacers are disposed on the second electrode layer.

In one embodiment, the liquid crystal unit has multiple pixel areas each comprising two or more than two liquid crystal areas which respectively have different liquid crystal molecule orientations.

In one embodiment, an anti-flash layer is disposed on a surface of one of the polarizers closer to a viewer viewing the liquid crystal display device.

In one embodiment, an anti-reflective film is disposed on a surface of the anti-flash layer.

In one embodiment, the liquid crystal layer comprises a nematic liquid crystal material, which has a negative dielectric anisotropy, wherein liquid crystal molecules of the nematic liquid crystal material are substantially perpendicular to the first substrate or the second substrate without any applied voltage.

The present disclosure also provides a method of manufacturing a liquid crystal display device. The method comprises the following steps. Preparing a liquid crystal unit, and forming, on the liquid crystal unit, a first substrate, a second substrate opposing the first substrate, and a liquid crystal layer disposed between the first substrate and the second substrate. Preparing a pair of polarizers, the pair of polarizers clamping the liquid crystal unit. Preparing an optical compensation film formed between at least one of the polarizers and the liquid crystal unit. The optical compensation film comprises a first film layer, a second film layer, a third film layer and a fourth film layer. The first film layer, the second film layer, the third film layer and the fourth film layer are stacked together, and respectively have a first refractive index, a second refractive index, a third refractive index and a fourth refractive index with different values, wherein the first refractive index is smaller than the second refractive index, and the third refractive index is smaller than the fourth refractive index.

In one embodiment, the method of this disclosure further comprises: forming a first electrode layer disposed between the first substrate and the liquid crystal layer on the liquid crystal unit.

In one embodiment, the method of this disclosure further comprises: forming a second electrode layer disposed between the second substrate and the liquid crystal layer on the liquid crystal unit.

In one embodiment, the method of this disclosure further comprises: forming, on the liquid crystal unit, a first vertical alignment layer disposed between the first electrode layer and the liquid crystal layer, and a second vertical alignment layer disposed between the second electrode layer and the liquid crystal layer.

As mentioned above, the liquid crystal display device of this disclosure can solve the change of the viewable angle when the included angle between the sight and the absorption axis of the polarizer is changed from the absorption axis of the polarizer, and can have the effects of reducing the light leakage and enhancing the brightness and the phase compensation at the same time by the design of stacking the first film layer, the second film layer, the third film layer, and the fourth film layer of the optical compensation film respectively having the first refractive index, the second refractive index, the third refractive index, and the fourth refractive index with different values, wherein the first refractive index is smaller than the second refractive index, and the third refractive index is smaller than the fourth refractive index.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the drawings.

DETAILED DESCRIPTION OF THE INVENTION

Figure 1:
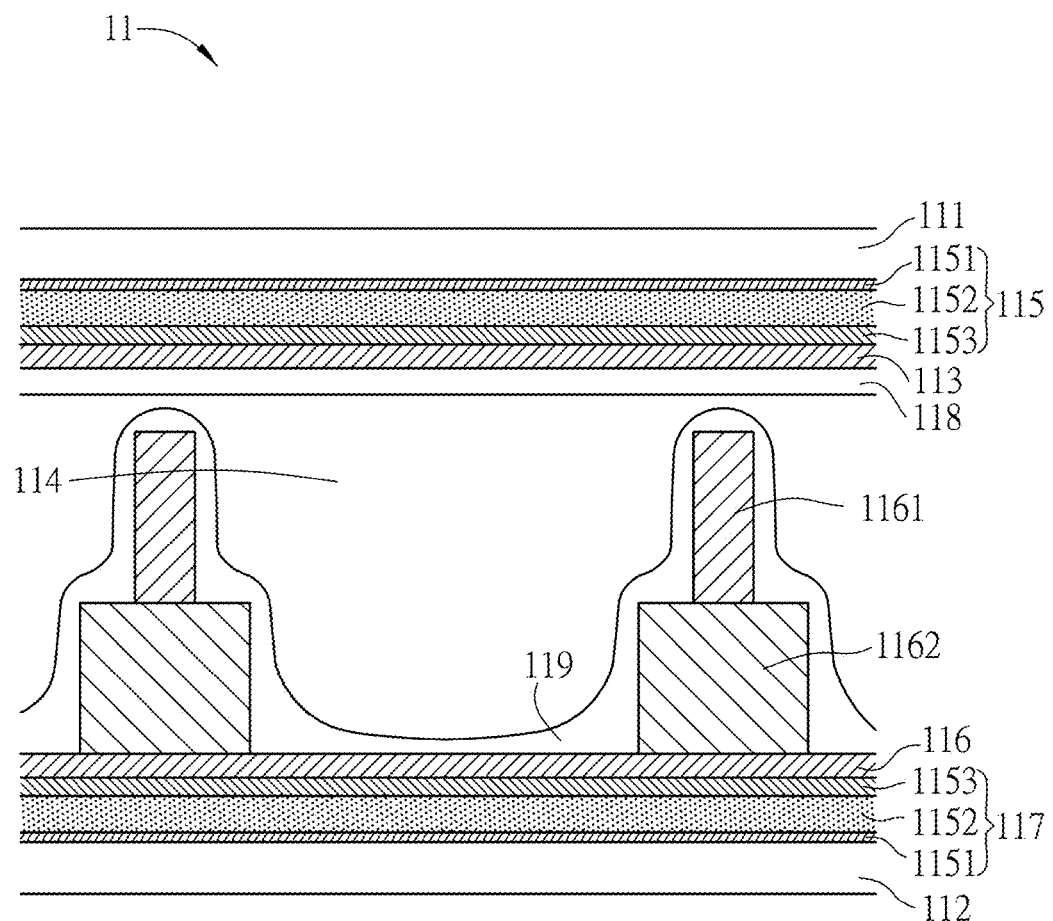
FIG. 1 is a schematic view showing a liquid crystal display device of an embodiment of this disclosure.

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "center", "transversal", "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one," "a" and "an" used here further intend to include plural forms. It should also be understood that the terms "comprising" and/or "including"

are used herein to describe the features to describe the presence of stated features, integers, steps, operations, units and/or elements without excluding the presence or addition of one or more other features, integers, steps, operations, units, elements, and/or combinations thereof.

This disclosure will be described in detail according to the preferred embodiment with reference to the drawings.

Figure 2:
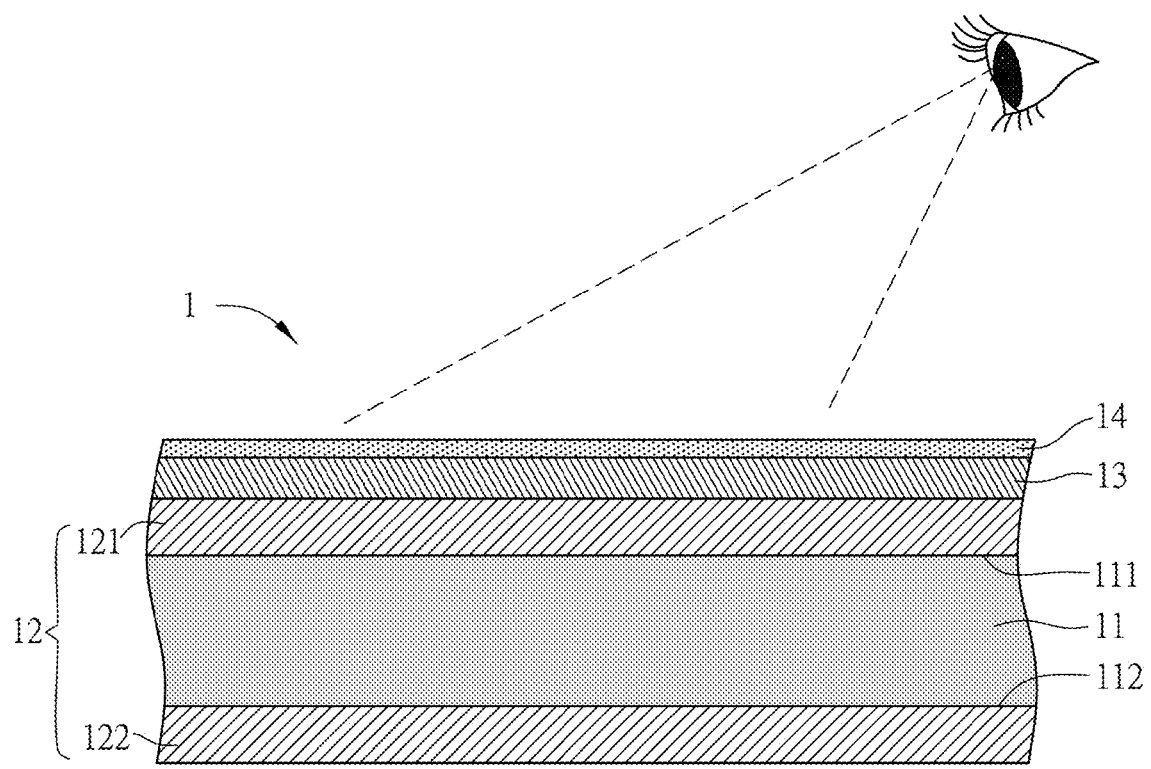
FIG. 2 is another schematic view showing a liquid crystal display device of an embodiment of this disclosure.
Figure 3:
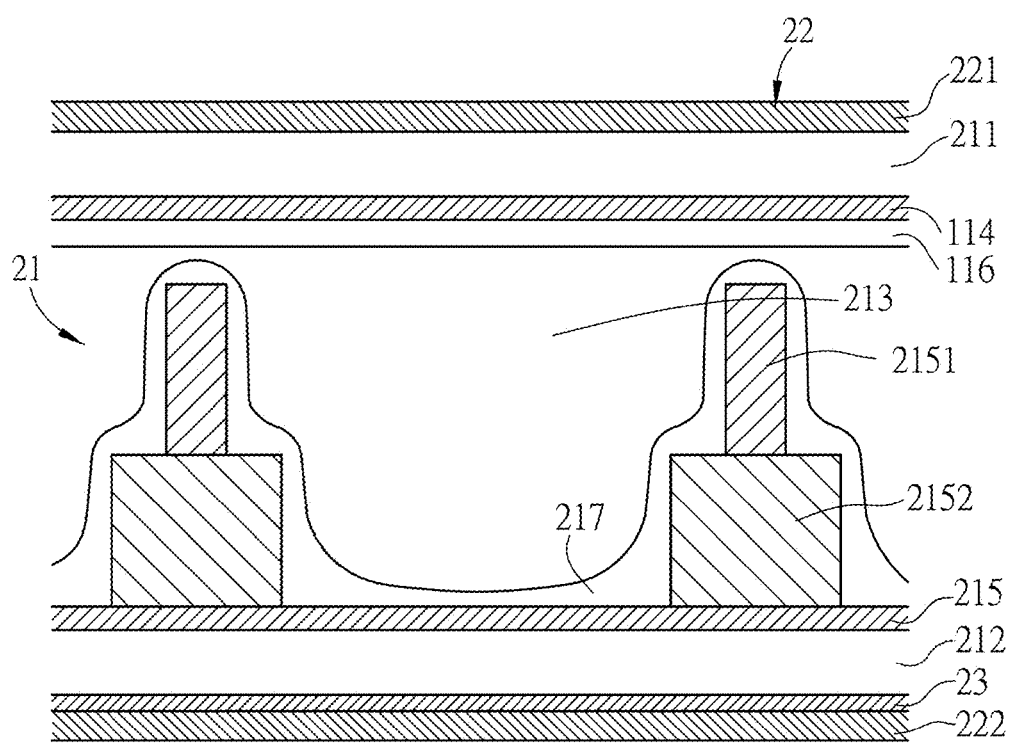
FIG. 3 is another schematic view showing a liquid crystal display device of an embodiment of this disclosure.
Figure 4:
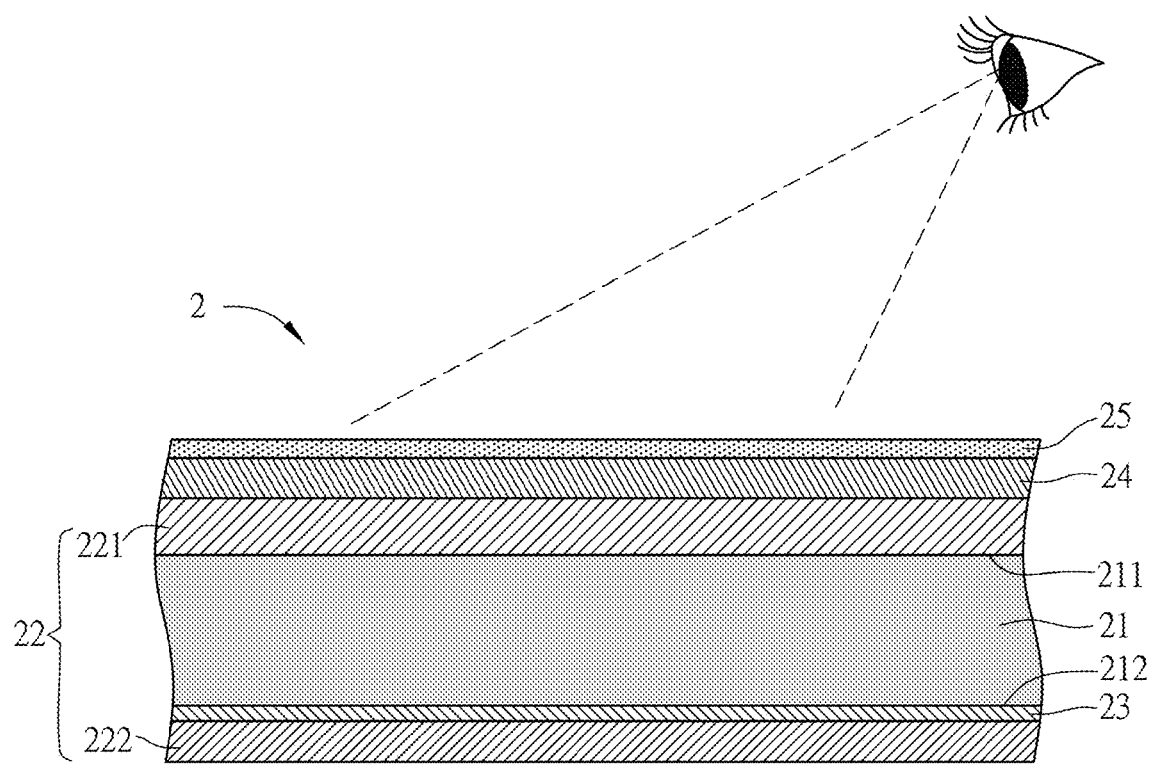
FIG. 4 is another schematic view showing a liquid crystal display device of an embodiment of this disclosure.
Figure 5:
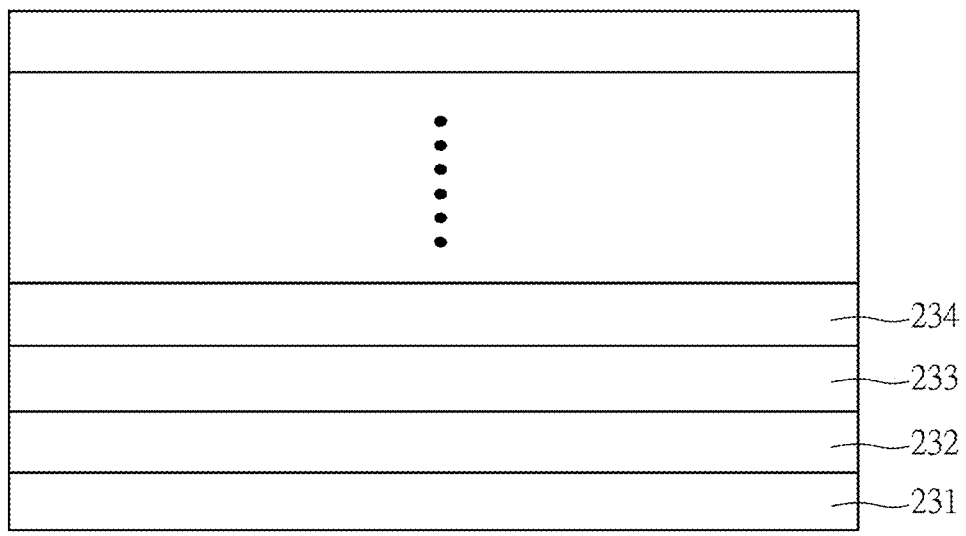
FIG. 5 is a schematic view showing an optical compensation film of an embodiment.

FIG. 1 is a schematic view showing a liquid crystal display device 1 of an embodiment of this disclosure. FIG. 2 is another schematic view showing a liquid crystal display device 1 of an embodiment of this disclosure. FIG. 3 is another schematic view showing a liquid crystal display device 2 of an embodiment of this disclosure. FIG. 4 is another schematic view showing a liquid crystal display device 2 of an embodiment of this disclosure. FIG. 5 is a schematic view showing an optical compensation film 23 of an embodiment. Liquid crystal display devices 1 and 2 are the liquid crystal display device (N-type MVA liquid crystal display device), or the ASM-type liquid crystal display device having a negative dielectric anisotropy.

Referring to FIG. 1, the liquid crystal display device 1 includes a liquid crystal unit 11, a pair of polarizers 12, an anti-flash layer 13, and an anti-reflective film 14. The liquid crystal unit 11 comprises a first substrate 111, a second substrate 112, a first electrode layer 113, a liquid crystal layer 114, a first optical compensation layer 115, a second electrode layer 116, a second optical compensation layer 117, a first vertical alignment layer 118 and a second vertical alignment layer 119.

The second substrate 112 is disposed opposite the first substrate 111. The first electrode layer 113 is disposed between the first substrate 111 and the second substrate 112. More precisely, the first electrode layer 113 is disposed between the first optical compensation layer 115 and the first vertical alignment layer 118. The liquid crystal layer 114 is disposed between the first electrode layer 113 and the second substrate 112. More precisely, the liquid crystal layer 114 is disposed between the first vertical alignment layer 118 and the second vertical alignment layer 119. The first optical compensation layer 115 is disposed between the first substrate 111 and the first electrode layer 113. The polarizers 12 clamp the liquid crystal unit 11. In this embodiment, the first electrode layer 113 is an ITO transparent electrode. Because the first optical compensation layer 115 has been integrated into the liquid crystal unit 11, and needs not to be additionally configured after the preparation of the liquid crystal unit 11 is completed. The overall manufacturing process of the liquid crystal display device 1 is simplified and the benefits of thinning are achieved at the same time.

The second electrode layer 116 is disposed between the liquid crystal layer 114 and the second substrate 112. More precisely, the second electrode layer 116 is disposed between the second optical compensation layer 117 and the second vertical alignment layer 119. The second optical compensation layer 117 is disposed between the second electrode layer 116 and the second substrate 112. The first vertical alignment layer 118 is disposed between the first electrode layer 113 and the liquid crystal layer 114. The second vertical alignment layer 119 is disposed between the second electrode layer 116 and the liquid crystal layer 114. In this embodiment, the second electrode layer 116 is an ITO transparent electrode. Because the second optical compensation layer 117 has been integrated into the liquid crystal unit 11, and needs not to be additionally configured after the preparation of the liquid crystal unit 11 is completed. The overall manufacturing process of the liquid crystal display device 1 is simplified and the benefits of thinning are achieved at the same time.

Protrusions 1161 and spacers 1162 are disposed on the second electrode layer 116. Each of the first optical compensation layer 115 and the second optical compensation layer 117 has an alignment layer 1151, a phase compensation material 1152 and a dielectric layer 1153. The material of the alignment layer 1151 is polyimide or poly methyl methacrylate (PMMA). The phase compensation material 1152 is the liquid crystal polymeric material or the non-liquid crystal material. The material of the dielectric layer 1153 is a protective insulation material. In this embodiment, a height of the protrusion 1161 is about 3 microns, and a height of the spacer 1162 is about 4.5 microns. The spacers 1162 are formed outside a pixel area, which use a light sensitive polyimide (such as ITO: about 100 nanometers) disposed on the second electrode layer 116, then the area enclosed by the protrusions 1161 is about 100 microns×100 microns and three such areas are formed in a pixel (about 100 microns× 300 microns).

The liquid crystal unit 11 has multiple pixel areas, and each of the pixel areas includes two or more than two liquid crystal areas which respectively have different liquid crystal molecule orientations. In the text, the term "pixel" is usually defined as the minimum unit that performs a display. In the text, the "pixel area" means an area or a part of a liquid crystal display device equivalent to a "pixel". When a pixel (rectangular pixel) has a large aspect ratio, a large number of pixel areas may be constituted by a rectangular pixel, most of the pixel areas used in each pixel are preferably as small as possible, the asymmetric orientation may be formed stably, and "asymmetric orientation" here means different orientations, such as a radial orientation, a concentric (tangent direction) orientation and a helical orientation.

Referring to FIG. 2, the anti-flash layer 13 is disposed on a surface of one of the polarizers 12 closer to a viewer viewing the liquid crystal display device 1. The anti-reflective film 14 is disposed on a surface of the anti-flash layer 13.

Upon implementation, the first optical compensation layer 115 is interposed between the first substrate 111 and the first electrode layer 113, and the protrusions 1161 and the spacers 1162 are disposed on the second electrode layer 116. Then, the second vertical alignment layer 119 is further disposed. In addition, the first vertical alignment layer 118 is disposed on the first electrode layer 113, and an N-type nematic liquid crystal (that is, the liquid crystal layer 114) is filled between the first vertical alignment layer 118 and the second vertical alignment layer 119.

Upon implementation, the second optical compensation layer 117 may be interposed between the second substrate 112 and the second electrode layer 116 on that side of the second substrate 112. In addition, on that side of the first substrate 111, the first optical compensation layer 115 may also be interposed between the first substrate 111 and the first electrode layer 113. The first optical compensation layer 115 and the second optical compensation layer 117 may be respectively interposed between the first substrate 111 and the first electrode layer 113 and between the second substrate 112 and the second electrode layer 116 at the same time (as shown in FIG. 1).

Illustrations will be made by taking the second optical compensation layer 117 as an example. In the production, the alignment layer 1151 is firstly coated on the second substrate 112, and the material may be the polyimide or poly methyl methacrylate (PMMA). Then, the phase compensation material 1152 is coated on the alignment layer 1151. After heating and/or UV light curing, the protective dielectric layer 1153 is further disposed. The phase compensation material 1152 may be the liquid crystal polymeric material or the non-liquid crystal material. After the dielectric layer 1153 is disposed, the second electrode layer 116 is coated on the dielectric layer 1153 by using a low-temperature coating technology (the process temperature is controlled at about 80 degrees Celsius). The production methods and processes of first optical compensation layer 115 are the same as those of the second optical compensation layer 117.

In addition, the first optical compensation layer 115 and the second optical compensation layer 117 may have the function of the single optical axis phase compensation such as the A-plate phase compensation or the C-plate phase compensation and the like, or have the function of the A+C-plate (double optical axis) phase compensation.

The two polarizers 12 (respectively a first polarizer 121 and a second polarizer 122, see FIG. 2) are disposed on two opposite sides of the liquid crystal unit 11, that is, disposed outside the first substrate 111 and the second substrate 112; and then a backlight module (not shown) is further disposed below the second polarizer 122.

As can be seen from FIGS. 1 and 2, in the liquid crystal display device 1 of this disclosure, by the design of disposing the first optical compensation layer 115 between the first substrate 111 and the first electrode layer 113, the first optical compensation layer 115 needs not to be additionally configured after the preparation of the liquid crystal unit 11 is completed. The overall manufacturing process of the liquid crystal display device 1 is simplified and the benefits of thinning are achieved at the same time.

Referring to FIG. 3, a liquid crystal display device 2 includes a liquid crystal unit 21, a pair of polarizers 22, an optical compensation film 23, an anti-flash layer 24 and an anti-reflective film 25. The liquid crystal unit 21 comprises a first substrate 211, a second substrate 212, a liquid crystal layer 213, a first electrode layer 214, a second electrode layer 215, a first vertical alignment layer 216 and a second vertical alignment layer 217.

The second substrate 212 is disposed opposite the first substrate 211, and the liquid crystal layer 213 is disposed between the first substrate 211 and the second substrate 212. More precisely, the liquid crystal layer 213 is disposed between the first vertical alignment layer 216 and the second vertical alignment layer 217. The polarizers 22 clamp the liquid crystal unit 21. The optical compensation film 23 is disposed between at least one of the polarizers 22 and the liquid crystal unit 21. More precisely, the optical compensation film 23 is disposed between at least one of the polarizers 22 and the first substrate 211, or disposed between at least one of the polarizers 22 and the second substrate 212.

The first electrode layer 214 is disposed between the first substrate 211 and the liquid crystal layer 213. More precisely, the first electrode layer 214 is disposed between the first substrate 211 and the first vertical alignment layer 216. The second electrode layer 215 is disposed between the liquid crystal layer 213 and the second substrate 212. More precisely, the second electrode layer 215 is disposed between the second substrate 212 and the second vertical alignment layer 217. The first vertical alignment layer 216 is disposed between the first electrode layer 214 and the liquid crystal layer 213. The second vertical alignment layer 217 is disposed between the second electrode layer 215 and the liquid crystal layer 213. In this embodiment, the first electrode layer 214 and the second electrode layer 215 are ITO transparent electrodes.

Protrusions 2151 and spacers 2152 are disposed on the second electrode layer 215. In this embodiment, a height of the protrusion 2151 is about 3 microns, and a height of the spacer 2152 is about 4.5 microns. The spacers 2152 are formed outside a pixel area, which use a light sensitive polyimide (such as ITO: about 100 nanometers) disposed on the second electrode layer 215, then the area enclosed by the protrusions 2151 is about 100 microns×100 microns and three such areas are formed in a pixel (about 100 microns× 300 microns).

The liquid crystal unit 21 has multiple pixel areas, and each of the pixel areas includes two or more than two liquid crystal areas which respectively have different liquid crystal molecule orientations. In the text, the term "pixel" is usually defined as the minimum unit that performs a display. In the text, the "pixel area" means an area or a part of a liquid crystal display device equivalent to a "pixel". When a pixel (rectangular pixel) has a large aspect ratio, a large number of pixel areas may be constituted by a rectangular pixel, most of the pixel areas used in each pixel are preferably as small as possible, the asymmetric orientation may be formed stably, and "asymmetric orientation" here means different orientations, such as a radial orientation, a concentric (tangent direction) orientation and a helical orientation.

The liquid crystal layer 213 includes a nematic liquid crystal material, which has a negative dielectric anisotropy, and the liquid crystal molecules of the nematic liquid crystal material without any applied voltage are substantially perpendicular to the first substrate 211 or the second substrate 212.

Referring to FIG. 4, the anti-flash layer 24 is disposed on a surface of one of the polarizers 22 closer to a viewer viewing the liquid crystal display device 2. The anti-reflective film 25 is disposed on a surface of the anti-flash layer 24.

Referring to FIG. 5, the optical compensation film 23 includes a first film layer 231, a second film layer 232, a third film layer 233 and a fourth film layer 234. The first film layer 231, the second film layer 232, the third film layer 233 and the fourth film layer 234 are stacked together, and respectively have a first refractive index, a second refractive index, a third refractive index and a fourth refractive index with different values, wherein the first refractive index is smaller than the second refractive index, and the third refractive index is smaller than the fourth refractive index. In particular, the first film layer 231, the second film layer 232, the third film layer 233 and the fourth film layer 234 may be sequentially stacked together.

Upon implementation, the optical compensation film 23 is disposed between one of the polarizers 22 and the first substrate 211, or disposed between another polarizer 22 and the second substrate 212, and protrusions 2151 and spacers 2152 are disposed on the second electrode layer 215. Then, the second vertical alignment layer 217 is further disposed. In addition, the first vertical alignment layer 216 is disposed on the first electrode layer 214, and an N-type nematic type liquid crystal (that is the liquid crystal layer 213) is filled between the first vertical alignment layer 216 and the second vertical alignment layer 217.

Upon implementation, the two polarizers 22 (respectively a first polarizer 221 and a second polarizer 222, see FIG. 4) are disposed on two opposite sides of the liquid crystal unit 21, that is, disposed outside the first substrate 211 and the second substrate 212; and then a backlight module (not shown) is further disposed below the second polarizer 222. On that side of the second substrate 212, the optical compensation film 23 may be disposed between the second substrate 212 and the second polarizer 222 (as shown in FIG. 3). In addition, on that side of the first substrate 211, the optical compensation film 23 (not shown) may also be disposed between the first substrate 211 and the first polarizer 221. The optical compensation film 23 (not shown) may be respectively disposed between the first substrate 211 and the first polarizer 221, and between the second substrate 212 and the second polarizer 222. When viewed in the path direction of incident light, the light sequentially passes through the first film layer 231, the second film layer 232, the third film layer 233, and the fourth film layer 234. When the light of the backlight module passes through the polarizers 22 is incident to the optical compensation film 23, the light is refracted multiple times and reflected multiple times through the film layer interface, thereby eventually causing most of the light source to penetrate through the optical compensation film 23, and having effects of brightness enhancement and phase compensation at the same time.

In addition, the optical compensation film 23 may has the function of the single optical axis phase compensation such as the A-plate phase compensation or the C-plate phase compensation and the like, or has the function of the A+C-plate (double optical axis) phase compensation.

As can be seen from FIG. 3 to FIG. 5, the liquid crystal display device 2 of this disclosure can solve the change of the viewable angle when the included angle between the sight and the absorption axis of the polarizer is changed from the absorption axis of the polarizer, and can have the effects of reducing the light leakage and enhancing the brightness and the phase compensation at the same time by the design of stacking the first film layer 231, the second film layer 232, the third film layer 233, and the fourth film layer 234 of the optical compensation film 23 respectively having the first refractive index, the second refractive index, the third refractive index, and the fourth refractive index with different values, wherein the first refractive index is smaller than the second refractive index, and the third refractive index is smaller than the fourth refractive index.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A liquid crystal display device, comprising:
    a liquid crystal unit comprising a first substrate, a second substrate opposing the first substrate, a liquid crystal layer disposed between the first substrate and the second substrate, a first electrode layer disposed between the first substrate and the liquid crystal layer, a second electrode layer disposed between the second substrate and the liquid crystal layer, a first vertical alignment layer disposed between the first electrode layer and the liquid crystal layer, a second vertical alignment layer disposed between the second electrode layer and the liquid crystal layer, and protrusions and spacers disposed on the second electrode layer, wherein the protrusions and the spacers are located between the second electrode layer and the second vertical alignment layer;
    a pair of polarizers clamping the liquid crystal unit;
    an optical compensation film disposed between at least one of the polarizers and the liquid crystal unit, wherein the optical compensation film comprises a first film layer, a second film layer, a third film layer and a fourth film layer, wherein the first film layer, the second film layer, the third film layer and the fourth film layer are stacked together, and respectively have a first refractive index, a second refractive index, a third refractive index and a fourth refractive index with different values, wherein the first refractive index is smaller than the second refractive index, and the third refractive index is smaller than the fourth refractive index;
    an anti-flash layer disposed on a surface of one of the polarizers closer to a viewer viewing the liquid crystal display device; and
    an anti-reflective film disposed on a surface of the anti-flash layer.

2. The liquid crystal display device according to claim 1, wherein the liquid crystal unit has multiple pixel areas each comprising two or more than two liquid crystal areas which respectively have different liquid crystal molecule orientations.

3. The liquid crystal display device according to claim 1, wherein the liquid crystal layer comprises a nematic liquid crystal material, which has a negative dielectric anisotropy, wherein liquid crystal molecules of the nematic liquid crystal material are substantially perpendicular to the first substrate or the second substrate without any applied voltage.

4. A method of manufacturing a liquid crystal display device, comprising steps of:
    preparing a liquid crystal unit, and forming, on the liquid crystal unit, a first substrate, a second substrate opposing the first substrate, a liquid crystal layer disposed between the first substrate and the second substrate, a first electrode layer disposed between the first substrate and the liquid crystal layer, a second electrode layer disposed between the second substrate and the liquid crystal layer, protrusions and spacers disposed on the second electrode layer, a first vertical alignment layer disposed between the first electrode layer and the liquid crystal layer, and a second vertical alignment layer disposed between the second electrode layer and the liquid crystal layer, wherein the protrusions and the spacers are located between the second electrode layer and the second vertical alignment layer;
    preparing a pair of polarizers, the pair of polarizers clamping the liquid crystal unit;
    preparing an optical compensation film formed between at least one of the polarizers and the liquid crystal unit, wherein the optical compensation film comprises a first film layer, a second film layer, a third film layer and a fourth film layer, wherein the first film layer, the second film layer, the third film layer and the fourth film layer are stacked together, and respectively have a first refractive index, a second refractive index, a third refractive index and a fourth refractive index with different values, wherein the first refractive index is smaller than the second refractive index, and the third refractive index is smaller than the fourth refractive index;
    preparing an anti-flash layer formed on a surface of one of the polarizers closer to a viewer viewing the liquid crystal display device; and
    preparing an anti-reflective film formed on a surface of the anti-flash layer.

* * * * *